Dec. 21, 1954     J. A. GREGOIRE     2,697,600
SUSPENSION MEANS FOR VEHICLES
Filed July 14, 1950

INVENTOR
Jean A. GREGOIRE
by
Mead, Browne, Schuyler & Beveridge

ATTORNEYS

United States Patent Office 2,697,600
Patented Dec. 21, 1954

2,697,600

SUSPENSION MEANS FOR VEHICLES

Jean A. Gregoire, Paris, France

Application July 14, 1950, Serial No. 173,887

Claims priority, application France July 20, 1949

3 Claims. (Cl. 267—61)

My invention relates to suspension means for vehicles incorporating coil springs operating under tensional conditions and in particular those spring coils that have been described in my copending application, Ser. No. 626,101 of November 1, 1945, now Patent 2,616,686, issued November 4, 1952. It is a known fact that in such suspensions, the proper operation of the suspension requires that the length of the spring when idle and its flexibility be properly defined.

In my other copending prior application Ser. No. 18,003 of March 30, 1948, now Patent 2,661,206, issued December 1, 1953, I have described an arrangement for the accurate adjustment of the two above mentioned variables.

This prior arrangement is entirely satisfactory, but it is comparatively costly and consequently its use is to be recommended chiefly on automobiles that are comparatively expensive.

My invention has for its object an arrangement of springs that, although it does not provide such a perfect adjustment, is, in contradistinction, of a very reduced cost price so as to allow its application to the mass production of comparatively cheap automobiles.

In this case, as a matter of fact, when the conditions impressed on the springs, such as their length when idle, and their flexibility, have been ascertained through calculation and checked, if required, experimentally by means e. g. of the adjusting means disclosed in my last mentioned prior specification, it is possible to provide an implementing for mass production in a manner such that it may be possible to produce spring systems that are not adjustable or that require only rough adjusting means, while, however, being accurate enough to show, within predetermined limits, the desired properties.

For this purpose and according to my invention, the springs are secured over terminal members provided with transversal openings for the engagement of hooks, said springs being characterized by the fact that the terminal members are rigid with abutments preferably cast in one therewith, said abutments being intended to limit the screwing movement of the springs. The position of said abutments is defined previously in a manner such that once the spring is mounted, the desired properties are obtained.

In this novel arrangement, consequently, there is no actual adjustment provided for the spring system; however, in the case where an adjustment of the spring length, when idle, is required, one of the terminal members may include elements screwed into one another so as to provide for adjustment of said length.

Further objects and features of my invention will appear in the reading of the following description, reference being made to accompanying drawings illustrating by way of example and by no means in a binding sense, two preferred embodiments of said invention. In said drawings.

Figure 1:
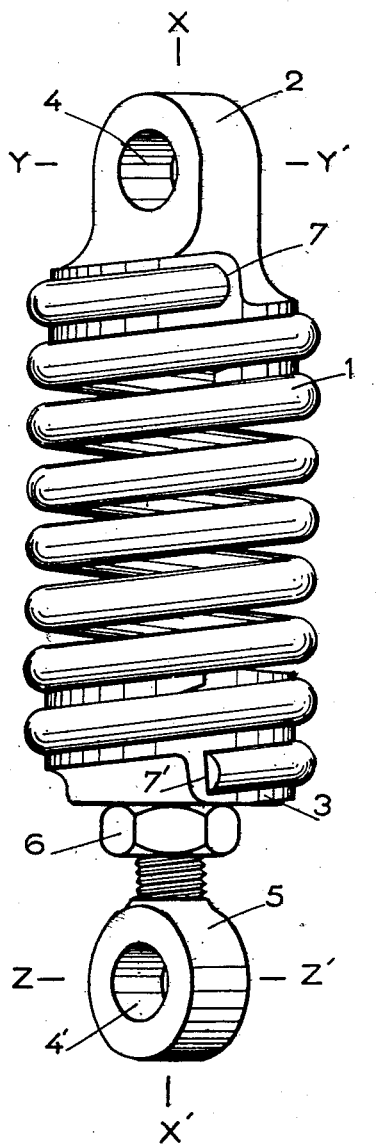
Fig. 1 illustrates a spring mounted between its two terminal members of which one is provided with length-adjusting means.

In Fig. 1, 1 designates the coil spring screwed on one hand into the terminal member 2 through one convolution or thereabouts, and to a similar extent over the other terminal member 3. The terminal member 2 is provided with a transversal bore 4 the axis YY' of which is perpendicular to the axis XX' of the spring and that is adapted to carry a pivot or hook.

The terminal member 3 is tapped along the axis XX' of the spring and inside said tapping is screwed an eyebolt 5 that may be locked in position by a counternut 6. The eyebolt 5 is provided with a bore 4' the axis ZZ' of which is adapted to receive the second pivot or hook for the spring arrangement.

The gist of the invention resides in the fact that the spring is screwed over the terminal members until it engages corresponding abutments 7, 7' at the end of the thread formed on the terminal members and cast in one with the corresponding terminal members.

The flexibility of the arrangement is defined by the number of free convolutions in the spring, in other words, by the difference between the total number of convolutions and the number of convolutions through which the spring engages the terminal members, i. e. in the case considered, two convolutions engaged respectively at either end of the spring.

When starting the production of such suspension means, the number of free convolutions is defined experimentally once and for all. However, if modifications are to be expected, either in the diameter of the spring wire or in the requirements of manufacture, tests are made on samples in order to check whether the flexibility remains within limits defined beforehand.

If required, a modified number of convolutions is defined that produces the desired flexibility, taking into account the modifications in the data.

It is then sufficient to adjust the distance between the two transversal axes 4, 4', i. e. between the lines YY' and ZZ'. This adjustment is easily performed through action on the eyebolt 5 that may be screwed or unscrewed with reference to the corresponding terminal member 3.

The adjustment as to length has an accuracy in either direction corresponding to ¼ of the pitch of the eyebolt thread as the axes YY' and ZZ' should remain substantially parallel.

When the counternut 6 is locked, the arrangement fitted between the pivots is completely proof against misadjustment as the spring can then be neither screwed nor unscrewed through the fact that both its ends are in engagement with corresponding stops.

Figure 2:
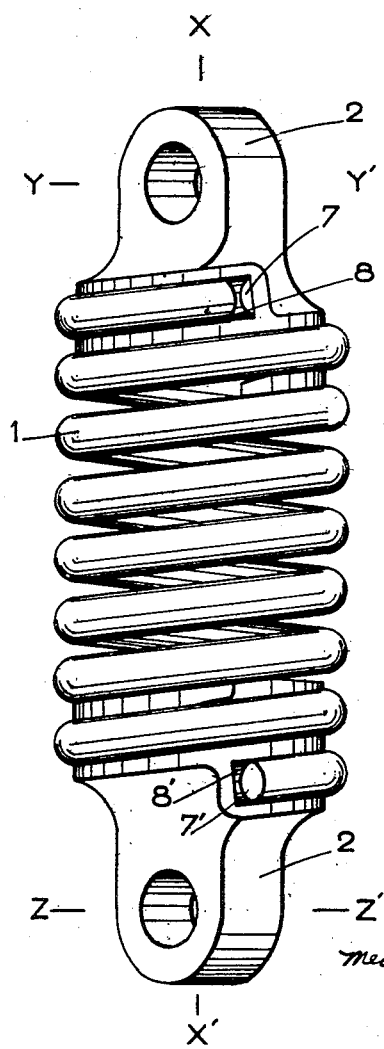
Fig. 2 shows a similar arrangement that is, however, devoid of any adjusting means.

The spring arrangement illustrated in Fig. 2 differs from that illustrated in Fig. 1 through the fact that the associated terminal member 3, eyebolt 5 and counternut 6 are replaced by a solid terminal member 2' similar to the terminal member 2 at the other end of the spring.

In this latter embodiment, it is no longer possible to adjust the flexibility or the length of the springs.

When it is desired to set this spring arrangement in position, the two terminal members 2 and 2' are screwed home with reference to the spring after which they are slightly unscrewed so that the two axes YY' and ZZ' of the bores 4, 4' may be parallel; this leaves a slight clearance at 8, 8' between the ends of the spring and the corresponding abutments 7, 7', the existence of said clearance being ensured in the very designing of the arrangement so as to make its mounting easier.

In this latter embodiment, there is no longer any possibility of adjustment either of flexibility or of length of spring.

The prototype or pattern should, therefore, be established with great care in order to satisfy requirements and properly calculated allowances should be defined in the case of mass production, both as concerns flexibility and length when idle. The checking of the allowances is performed on the spring arrangement when mounted, as disclosed with reference to the drawings.

Obviously, various modifications may be brought to the arrangement without unduly widening thereby the scope of the invention as defined in accompanying claims.

What I claim is:

1. In a suspension for elastically connecting parts carried respectively by the suspended and unsuspended sections of a vehicle, the combination of a coil spring, two aligned substantially cylindrical terminal members at either end of said coil spring, each member being provided externally with a helical hollow thread opening into the front surface of the member facing the other member and terminating at its inner end with a transverse flat wall, said hollow thread engaging the convolutions of the corresponding portion of the coil spring with a small clearance and the transverse terminal wall of said thread being adapted to form an abutment for the corresponding terminal cross-section of the coil spring, said terminal members being provided each with a transverse perforation for engagement with the parts to be connected, the axes of said perforations being perpendicular to the axes of the terminal members.

2. In a suspension for elastically connecting parts carried respectively by the suspended and unsuspended sections of a vehicle, the combination of a coil spring, two aligned substantially cylindrical terminal members at either end of said coil spring, each member being provided externally with a helical hollow thread opening into the front surface of the member facing the other member and terminating at its inner end with a transverse flat wall, said hollow thread engaging the convolutions of the corresponding portion of the coil spring with a small clearance and the transverse terminal wall of said thread being adapted to form an abutment for the corresponding terminal cross-section of the coil spring, one of said terminal members being provided with a transverse perforation for engagement with the parts to be connected, the other terminal member being axially tapped, and an eye-bolt screwed inside said tapping in the last mentioned terminal member, means for locking the eye-bolt in a longitudinally adjusted position with reference to the corresponding terminal member, the axes of the transverse perforation in the first member and of the eye in the eye bolt being perpendicular to the axes of the corresponding terminal members.

3. In a suspension for elastically connecting parts carried respectively by the suspended and unsuspended sections of a vehicle, the combination of a coil spring, two aligned substantially cylindrical terminal members at either end of said coil spring, each member being provided externally with a helical hollow thread opening into the front surface of the member facing the other member and terminating at its inner end with a transverse flat wall, said hollow thread engaging the convolutions of the corresponding portion of the coil spring with a small clearance and the transverse terminal wall of said thread being adapted to form an abutment for the corresponding terminal cross-section of the coil spring, one of said terminal members including two parts aligned axially with each other and the total length of which is adjustable, the outer part of said two-part member and the outer end of the other terminal member being provided each with a transverse perforation for engagement with the parts to be connected, the axes of said perforations being perpendicular to the axes of the terminal members respectively.

References Cited in the file of this patent

UNITED STATES PATENTS

| Number | Name | Date |
|---|---|---|
| 571,972 | Janney | Nov. 24, 1896 |
| 1,038,446 | Schoen | Sept. 10, 1912 |
| 1,301,003 | Plunkett | Apr. 15, 1919 |
| 1,791,661 | Cunningham | Feb. 10, 1931 |
| 2,264,070 | Davis | Nov. 25, 1941 |